G. R. CAROTHERS.
DOUBLE GEARED CHAIN HOIST.
APPLICATION FILED DEC. 17, 1908.
1,124,390.
Patented Jan. 12, 1915.
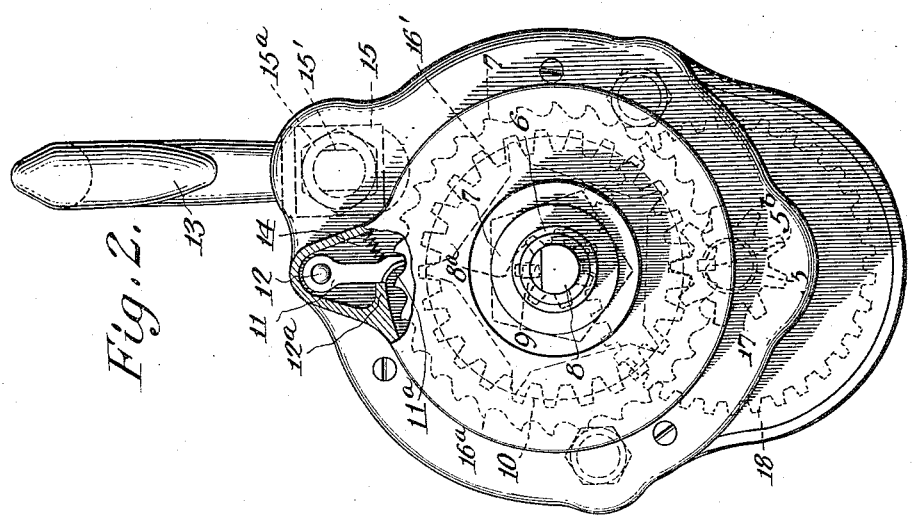
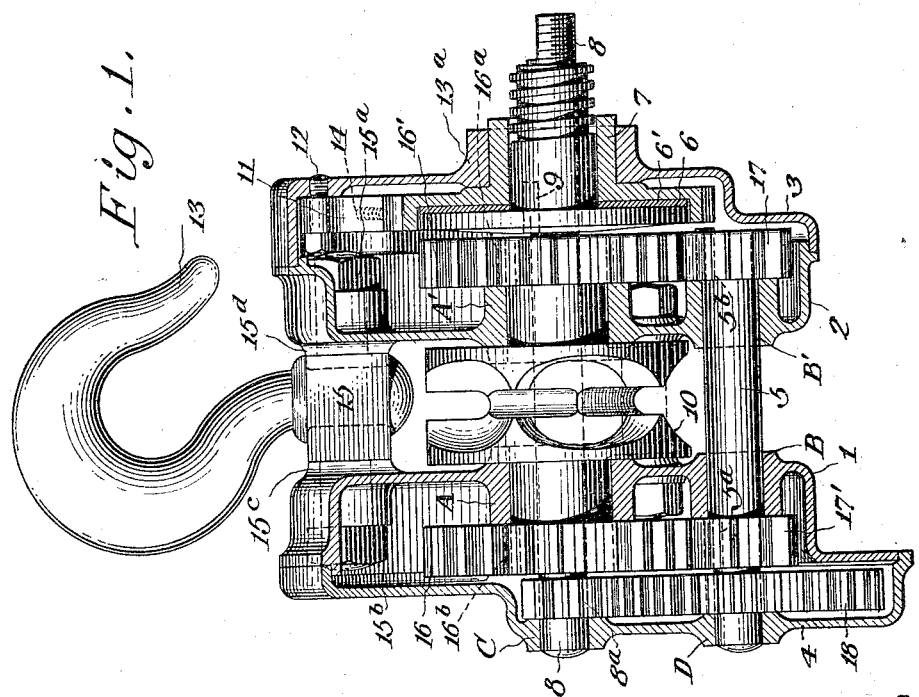
Witnesses:
H. H. Williamson
S. M. Gallagher
Inventor:
George R. Carothers
Atty.

UNITED STATES PATENT OFFICE.

GEORGE R. CAROTHERS, OF PHILADELPHIA, PENNSYLVANIA.

DOUBLE-GEARED CHAIN HOIST.

1,124,390. Specification of Letters Patent. Patented Jan. 12, 1915.

Application filed December 17, 1908. Serial No. 467,990.

*To all whom it may concern:*

Be it known that I, GEORGE R. CAROTHERS, a citizen of the United States, residing at Philadelphia, in the county of Philadelphia and State of Pennsylvania, have invented a certain new and useful Improvement in Double-Geared Chain Hoists, of which the following is a specification.

This invention relates to portable chain hoists, and particularly to a double geared hoist with single lifting chain.

The prime object of my invention is to provide a double geared chain hoist which shall be simple, compact of great lifting capacity for its weight and of high mechanical efficiency.

Referring to the drawings Figure 1 is a longitudinal section of the casing, the operating parts of the hoist being left in elevation. Fig. 2, a side elevation of my improved hoist, a portion of the casing being broken away to show the stop pawl in engagement with the ratchet wheel.

In Fig. 1, 1 and 2 represent the frame, or casing members, and 3 and 4 the covers of same.

10 is a load wheel with extended shaft journaled in bearings A and A' of said casing members.

On the ends of said load wheel shaft are gears 16 and 16' secured to same by keys 16$^a$ and 16$^b$.

On an auxiliary shaft 5, parallel to the axis of 10, and journaled in the bearings B, B' and D are two pinions 17 and 17' meshing in the gears 16 and 16'.

To the left of pinion 17' on the shaft 5 is a gear 18 which in turn meshes in a pinion 8$^a$, affixed to or integral with the shaft 8. The pinion shaft 8 is journaled in the bearing C, passing through the load wheel shaft 10 and the friction plate 6, being secured to the latter by the key 9.

Friction plate 6 passes through and is journaled in the ratchet friction 7, which in turn is journaled in the loss 13$^a$.

At the top of cover 3 is a dog or stop 11 swinging on the bolt 12 and controlled by the spring 14.

When the load is being raised by the hoist the ratchet friction is jammed by a hand chain wheel (not shown in these drawings as it is common to all hand chain hoists) screwed on the threaded shank of friction plate 6, against the friction washer 6' and the friction mechanism moves together. The teeth of ratchet friction 7 pass under the stop or dog 11 freely. When power is no longer applied the dog 11 engages with the teeth of ratchet friction 7 and is carried against the projecting boss 12$^a$ and prevents further reverse motion. To lower the load the direction of motion of the hand chain is reversed unscrewing the wheel on thread of 6, releasing the pressure on friction washer 6' and the load is thus safely lowered. To prevent stop 11 from clicking against the teeth of ratchet friction 7 it is provided with a buffer of leather or other soft material 11$^a$.

The supporting hook 13 is swiveled in the block 15 which is extended to pass through the bosses 15$^c$ and 15$^d$; the ends of said extensions are threaded to receive the nuts 15$^a$ and 15$^b$, the bodies of said extensions are flattened, or given some other form than cylindrical, as shown at 15' to prevent block 15 from turning in bosses 15$^c$ and 15$^d$.

In Fig. 2 the center line of said supporting hook 13 is nearly over the pitch line of load wheel 10 and the object of making the form of the swivel block ends held in the bosses 15$^c$ and 15$^d$ any other section than circular is to prevent their turning in the same and thus providing that the hoist shall always hang vertical, no matter what its load.

Having thus fully described my invention, what I claim as new and useful, is—

In a hoist of the character described the combination of two casing members, a hollow shaft projecting in each casing member, a load wheel carried by said shaft and lying between the casing members, a gear carried by each end of said shaft, one of said gears situated in each of the casing members, a pinion shaft passing entirely through both of the casing members, a pinion carried by said shaft situated within one of the casings and lying between one of the walls of said casing and its adjacent gear, an auxiliary shaft passing through one of the casing members and projecting into the other casing member, a gear mounted upon said shaft lying within one of the casings and meshing with the pinion, two other pinions mounted upon said auxiliary shaft, one of said pinions situated in each of the casing members and meshing with the first named gears, a ratchet wheel mounted upon the pinion shaft and a pawl adapted to engage said ratchet wheel to prevent retrograde movement as shown and described.

In testimony whereof, I have hereunto affixed my signature in the presence of two subscribing witnesses.

GEORGE R. CAROTHERS.

Witnesses:
 EDWARD W. AUSTIN,
 S. M. GALLAGHER.

Copies of this patent may be obtained for five cents each, by addressing the "Commissioner of Patents, Washington, D. C."